3,027,357
CROSS-LINKING CARBOXYL CONTAINING POLYMERS

Ralph Stickle, Jr., St. Albans, W. Va., assignor to Union Carbide Corporation, a corporation of New York
No Drawing. Filed July 15, 1958, Ser. No. 748,617
13 Claims. (Cl. 260—78.5)

This invention relates to novel polymer compositions which are useful for protective coating, molding and adhesive bonding applications, and to methods for their preparation. In a broad aspect, this invention relates to an improved method for modifying the properties of polymers containing free carboxylic acid groups. In a particular aspect, this invention relates to a method for converting thermoplastic polymers containing free carboxylic acid groups to compositions which are less thermoplastic and more resistant to solvents by reaction with certain polyepoxide derivatives hereinafter more fully described.

Polymers containing free carboxylic acid groups are well known in the plastics industry. It has been found that the inclusion of components which provide free carboxylic acid groups in many of the widely used resins affords materials with new and improved properties, particularly improved adhesion to inert bodies or matrices. For example, copolymers of vinyl chloride and maleic acid have better adhesion than polyvinyl chloride homopolymers. Also, vinyl chloride terpolymers with dialkyl maleates and half-ester maleates have improved adhesion and compatibility due to the acid component. Minor amounts of acrylic acid in combination with acrylate monomers improve the adhesion and resistance to creep of the resulting adhesives. In emulsion polymerizations, olefinic carboxylic acid monomers are often employed with a variety of other olefinic monomers because upon neutralization the acid groups contained in the polymers serve to increase the stability of the dispersions formed and aid in dispersing inorganic particles contained therein.

The presence of free carboxylic acid groups in resins also serve as functional sites for modifications of polymer properties. The modifications are based on the reaction of the acid groups with reactive materials such as hydroxyl compounds and basic compounds.

The reaction of resins containing free carboxylic acid groups with epoxide compounds has been investigated as a means for modifying properties of the resins. French Patent No. 881,981 discloses the reaction between free carboxylic acid-containing resins and polyepoxides. The degree of cross-linking accomplished by this teaching is not sufficient to impart a high degree of infusibility and solvent insolubility to the modified resins. The partially cross-linked polymers are unsatisfactory for use as protective coatings and for the manufacture of chemically inert articles.

United States Patent No. 2,604,457 proposes the use of polymeric 4-vinylcyclohexene diepoxide to convert thermoplastic styrene polymers containing free carboxylic acid groups to thermoset resins. This particular polymeric diepoxide, although relatively expensive, requires excessive amounts because of low efficiency. The solubility and compatibility nature of the diepoxide limits its application.

United States Patent No. 2,604,464 proposes the use of diphenylolpropane diglycidyl ether as a cross-linking agent in the same manner as described in United States Patent No. 2,604,457 for polymeric 4-vinylcyclohexene diepoxide. Diphenylolpropane diglycidyl ether appears to have some advantages over polymeric 4-vinylcyclohexene diepoxide as an agent for cross-linking polymers containing free carboxylic acid groups, but in both cases the use of an organic basic catalyst is required to obtain a satisfactory degree of cross-linking due to the low reactivity of the respective epoxide groups.

Accordingly, it is a main object of this invention to provide an improved method for converting thermoplastic, fusible, solvent soluble polymers to materials which are less thermoplastic and are most resistant to moisture and solvents, which makes them particularly useful for protective coating applications and molding applications.

Various other objects and advantages of the present invention will become apparent from the accompanying description and disclosure.

One or more of the objects of this invention are accomplished by admixing together a polymer containing free carboxylic acid groups and a compound having at least two cyclohexene oxide groups.

This invention is based on the discovery that when a resinous polymer containing free or available carboxylic acid groups is reacted with a polyepoxide derivative having at least two cyclohexene oxide groups contained therein, hereinafter more fully described, there are obtained a variety of useful resinous compositions possessing highly desirable physical properties. For example, coating compositons of thermoplastic, fusible, solvent soluble polymers containing free carboxylic acid groups in admixture with a compound having at least two cyclohexene oxide groups may be applied to a surface either in a solvent vehicle or as an aqueous dispersion system and either baked or allowed to dry at room temperature or other moderate temperatures for a period of time sufficient to allow cross-linking to occur. Coatings are thus obtainable which are continuous, hard and thermoset. In addition, the coatings are infusible, moisture-resistant and are especially outstanding in their solvent insolubility.

Adhesive compositions of thermoplastic polymers containing free carboxylic acid groups can be admixed with a suitable amount of a compound containing at least two cyclohexene oxide groups at a temperature and for a period of time sufficient to cause cross-linking. The adhesive compositions thus modified are more solvent insoluble and are vastly superior to the untreated adhesive compositions in their "non-slip" properties, i.e., ability to resist "creeping."

The method of this invention for cross-linking free carboxylic acid-containing polymers proceeds with greater ease and efficiency to produce compositions with superior properties than has been heretofore possible by other methods using epoxide cross-linking agents. Without wishing to be bound by any particular theory, it is believed that the advantages characteristic of this invention are provided by the presence of cyclohexene oxide functions in the cross-linking agents which are particularly reactive with acidic groups. It is an essential feature of this invention that the cross-linking agent employed must contain at least two of these highly reactive cyclohexene oxide groups. If an epoxide cross-linking agent does not contain any cyclohexene oxide groups, or if it contains only one cyclohexene oxide group, the advantages obtained by the practice of this invention are not realized. Epoxide cross-linking agents containing no cyclohexene oxide groups, such as diphenylolpropane diglycidyl ether, as mentioned previously, are so sluggish and inefficient that these cross-linking agents require the presence of a catalyst and must be employed in relatively large quantities. Epoxide cross-linking agents which contain only one cyclohexene oxide group such as vinyl cyclohexene dioxide, are, at best, only a little better than the cross-linking agents not containing any cyclohexene oxide groups in their efficiency and ease of reaction with carboxylic acid groups. The rate and efficiency of the cross-linking function of such a compound is moderated by the reactive ability of the most sluggish epoxide group. If under a particular set of reaction conditions the sluggish epoxide group does not react at all, then no cross-linking will occur even though the cyclohexene oxide group in the compound has reacted rapidly and efficiently.

By the term "cyclohexene oxide" group as used herein is meant the structure

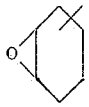

By the term "cyclohexene oxide oxirane oxygen" is meant an oxygen atom contained in a three-membered ring which shares two adjacent carbon atoms of a cyclohexene ring.

By "free" or "available" carboxylic acid group as used herein is meant the polymer-bound acid structure (—COOH).

By "thermoplastic" polymer as used herein is meant a polymer which can be made to assume new shapes by the application of heat and pressure.

In the practice of this invention the polymer containing a free carboxylic acid group that is to be modified is admixed with a sufficient quantity of a polyepoxide compound having two or more cyclohexene oxide groups to provide between 0.1 and 4.0, and preferably between 0.5 and 1.5, cyclohexene oxide oxirane oxygen groups for each free carboxylic acid group in the polymer.

The cross-linking reaction is accomplished by admixing the polymer and the cross-linking agent at a temperature sufficient to promote reaction. It is preferred, however, to perform the reaction at a temperature between about 25° C. and 150° C. for a period sufficient to accomplish the interaction of epoxide groups with free carboxylic acid groups. The ratio of epoxide groups to carboxylic acid groups is determined by the particular modifications being sought in the resulting polymeric material. At least one available epoxide group must be present per each free carboxylic acid group in an admixture if the maximum amount of cross-linking is to be accomplished, i.e., if the most rigid, solvent-insoluble cross-linked derivative of a particular polymer is desired. The maximum cross-linking generally is sought, for example, in molding applications and in various coating applications where tough, thermoset, plastic products are to be produced.

The interaction of less than one epoxide group per each free carboxylic acid group in an admixture will result in a product which has less than the maximum degree of cross-linking. This is desirable when it is advantageous to have free carboxylic acid groups present in the final cross-linked resin product to serve some particular function, e.g., in protective coating applications it is usually preferred not to cross-link all of the free polymer carboxylic acid groups so that the polymer retains adhesiveness to a substrate as provided by free carboxylic acid groups contained in the polymer. Resin compositions which are used as adhesives are only partially cross-linked to improve certain characteristics of the adhesive composition, such as "non-slip" quality, while maintaining tackiness and solvent solubility. Significant improvement of "non-slip" quality of an adhesive composition containing polymer-bound free carboxylic acid groups can be obtained by reacting the adhesive with a quantity of cross-linking agent which provides as little as 0.02 cyclohexene oxide oxirane oxygen groups per free carboxylic acid group in the adhesive composition.

In other cases, cross-linking is accomplished to a degree which provides various other resin properties being sought, such as flexibility and toughness in the modified final product.

The modification produced by reacting carboxylic acid-containing polymers with the cyclohexene oxide compounds of this invention depends on the number and location of the free carboxylic acid groups in a polymer molecule. The presence of multiple carboxylic acid groups along a polymer chain allows an extensive cross-linking action to occur and the final product can be a thermoset, infusible material. If a polymer has only a few free carboxylic acid groups along the chain, or just as chain end groups, then the apparent effect can be one of increased molecular weight and chain length, or one of reduction in acid number.

Among the many types of cross-linking agents having at least two epoxycyclohexane groups in the molecule of which specific representative compounds have been tested and shown to be effective in achieving the objects of this invention are those cross-linking agents characterized by the general formulas:

(A) 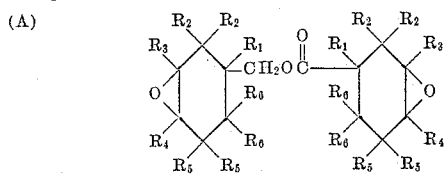

wherein $R_1$ represents a hydrogen atom, a halogen atom or a lower alkyl radical containing between one and four carbon atoms, $R_2$, $R_3$, $R_4$, $R_5$ and $R_6$ represent a hydrogen atom or a lower alkyl radical containing between one and four carbon atoms.

(B) 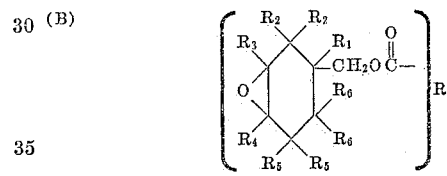

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl radical containing between one and four carbon atoms, and R represents a divalent hydrocarbon radical containing zero to ten carbon atoms.

(C) 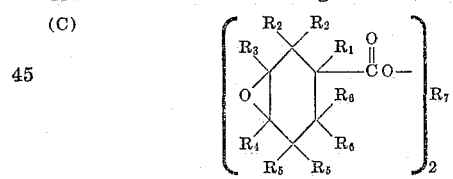

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl radical containing between one and four carbon atoms, and $R_7$ represents a divalent hydrocarbon radical containing two to ten carbon atoms.

(D) 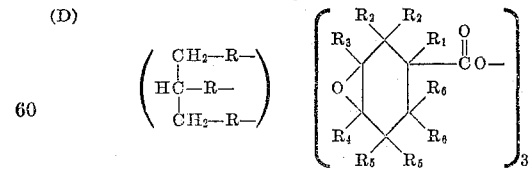

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl group containing between one and four carbon atoms, and R is a hydrocarbon radical having between zero and ten carbon atoms.

(E) 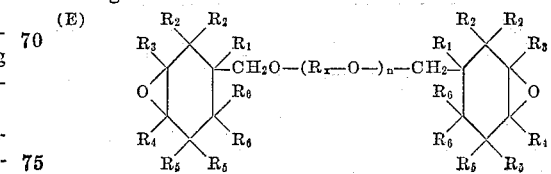

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl group containing between one and four carbon atoms, $R_x$ is an alkylene radical having between two and four carbon atoms, and $n$ is an integer having a value between one and five.

(F) 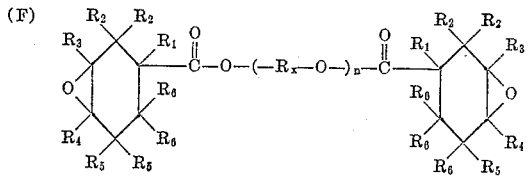

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl group containing between one and four carbon atoms, $R_x$ is an alkylene radical having between two and four carbon atoms, and $n$ is an integer having a value between one and five.

(G) 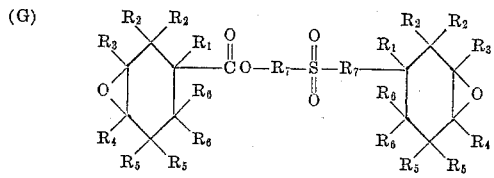

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl group containing between one and four carbon atoms, and $R_7$ is a divalent hydrocarbon radical having between two and ten carbon atoms.

(H) 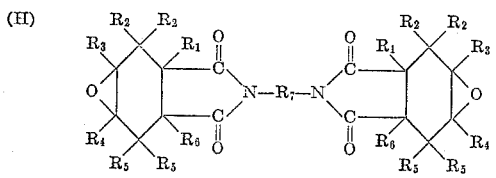

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl group containing between one and four carbon atoms, and $R_7$ is a divalent hydrocarbon radical having between two and ten carbon atoms.

(I) 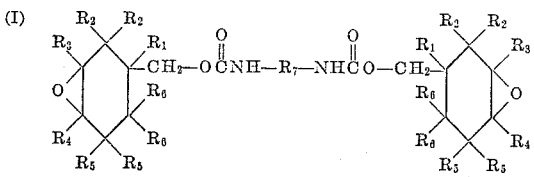

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl radical containing between one and four carbon atoms, and $R_7$ is a divalent hydrocarbon radical having between two and ten carbon atoms.

(J) 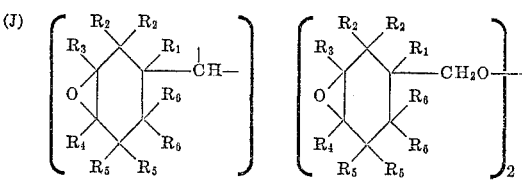

wherein $R_1$ represents a hydrogen atom, a halogen atom or a lower alkyl group containing between one and four carbon atoms, $R_2$, $R_3$, $R_4$, $R_5$ and $R_6$ represent a hydrogen atom or a lower alkyl radical containing between one and four carbon atoms.

(K) 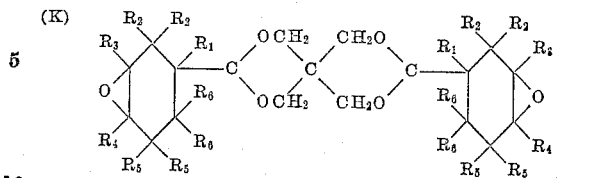

wherein $R_1$ represents a hydrogen atom, a halogen atom, or a lower alkyl group containing between one and four carbon atoms, $R_2$, $R_3$, $R_4$, $R_5$ and $R_6$ represent a hydrogen atom or a lower alkyl radical containing between one and four carbon atoms.

Among the compounds characterized by general Formula A which deserve particular mention are 3,4-epoxycyclohexylmethyl 3,4-epoxycyclohexanecarboxylate;
3,4-epoxy-1-methylcyclohexylmethyl 3,4-epoxy-1-methylcyclohexanecarboxylate;
3,4-epoxy-2-ethylcyclohexylmethyl 3,4-epoxy-2-ethylcyclohexanecarboxylate;
3,4-epoxy-6-methylcyclohexylmethyl 3,4-epoxy-6-methylcyclohexanecarboxylate;
3,4-epoxy-1-chlorocyclohexylmethyl 3,4-epoxy-1-chlorocyclohexanecarboxylate;
3,4-epoxy-1-bromocyclohexylmethyl 3,4-epoxy-1-bromocyclohexanecarboxylate;
4,5-epoxy-1-chloro-2-methylcyclohexylmethyl 4,5-epoxy-1-chloro-2-methylcyclohexanecarboxylate, and the like.

The compounds represented by general Formula B which deserve special mention are bis(3,4-epoxycyclohexylmethyl) pimelate;
bis(3,4-epoxy-6-methylcyclohexylmethyl) maleate;
bis(3,4-epoxy-5-methylcyclohexylmethyl) succinate;
bis(3,4-epoxy-1-bromocyclohexylmethyl) oxalate;
bis(3,4-epoxy-1-chlorocyclohexylmethyl) sebacate;
bis(3,4-epoxy-2-methylcyclohexylmethyl) adipate;
bis(3,4-epoxycyclohexylmethyl) terephthalate;
bis(3,4-epoxy-6-methylcyclohexylmethyl) terephthalate, and the like.

The class of compounds characterized by general Formula C are exemplified by 3-methyl-1,5-pentanediol bis(3,4-epoxycyclohexanecarboxylate);
1,10-decanediol bis(3,4-epoxy-1-methylcyclohexanecarboxylate);
2-methoxymethyl-2,4-dimethyl-1,5-pentanediol bis(3,4-epoxy-6-ethylcyclohexanecarboxylate);
ethylene glycol bis(3,4-epoxycyclohexanecarboxylate);
ethylene glycol bis(3,4-epoxy-6-methylcyclohexanecarboxylate);
2,2-diethyl-1,3-propanediol bis(3,4-epoxy-2-methylcyclohexanecarboxylate);
1,6-hexanediol bis(3,4-epoxy-1-bromocyclohexanecarboxylate);
2-butene-1,4-diol bis(3,4-epoxycyclohexanecarboxylate);
2-butene-1,4-diol bis(3,4-epoxy-6-methylcyclohexanecarboxylate), and the like.

Typical of the compounds characterized by general Formula D are 1,1,1-trimethylolpropane tris (3,4-epoxycyclohexane carboxylate);
1,2,3-propanetriol tris(3,4-epoxy-1-methylcyclohexanecarboxylate);
1,1,1-tris(2-ethanol)propane tris(3,4-epoxy-6-methylcyclohexanecarboxylate), and the like.

Among the compounds characterized by general Formula E which are representative of the class are bis(3,4-epoxy-6-methylcyclohexylmethyl) diethylene glycol ether; bis(3,4-epoxycyclohexylmethyl) tripropylene glycol ether;

bis(3,4-epoxy-1-chlorocyclohexylmethyl) diethylene glycol ether, and the like.

Representative polyepoxide cross-linking agents characterized by general Formula F are compounds such as dipropylene glycol bis(2 1ethylhexyl-4,5-epoxycyclohexane-1,2-dicarboxylate); diethylene glycol bis(3,4-epoxy-6-methylcyclohexanecarboxylate); triethylene glycol bis(3,4-epoxy-1-chlorocyclohexanecarboxylate), and the like.

Among the compounds characterized by general Formula G which deserve special mention are 2,2'-sulfonyldiethanol bis(3,4-epoxycyclohexanecarboxylate); 3,3'-sulfonyldipropanol bis(3,4-epoxy-6-methylhexylcyclohexanecarboxylate) and p,p'-sulfonyldibenzyl alcohol bis(3,4-epoxy-1-chlorocyclohehanecarboxylate).

Representative polyepoxide cross-linking agents characterized by general Formula H are compounds such as N,N'-ethylene bis(4,5-epoxycyclohexane-1,2-dicarboximide); N,N'-propylene bis(4,5-epoxy-6-methylcyclohexane-1,2-dicarboximide); N,N'-(p-phenylene) bis(4,5-epoxycyclohexane-1,2-dicarboximide), and the like.

Among the compounds characterized by general Formula I are di(3,4-epoxycyclohexylmethyl) 1,3-tolylenedicarbamate; di(3,4-epoxy-6-methylcyclohexylmethyl) ethylene-dicarbamate; di(3,4-epoxy-1-chlorocyclohexylmethyl) 1,4-phenylenedicarbamate; di(3,4-epoxy-1-butylcyclohexylmethyl) 1,4-butanedicarbamate, and the like.

Representative polyepoxide cross-linking agents characterized by general Formula J are compounds such as bis(3,4-epoxycyclohexylmethyl) 3,4-epoxycyclohexanecarboxaldehyde; bis(3,4-epoxy-6-methylcyclohexylmethyl) 3,4-epoxy-6-methylcyclohexanecarboxaldehyde; bis(3,4-epoxy-1-propylcyclohexylmethyl) 3,4-epoxy-1-bromocyclohexanecarboxaldehyde, and the like.

The compounds characterized by general Formula K include 3,9-bis(3,4-epoxycyclohexyl)spirobi(meta-dioxane); 3,9-bis(3,4-epoxy-1-ethylcyclohexyl)spirobi(metadioxane); 3,9-bis(3,4-epoxy-1-bromo-6-methylcyclohexyl)spirobi(metadioxane), and the like.

A wide variety of polymeric materials that contain free carboxylic acid groups can be modified according to this invention. The polymers can be saturated or unsaturated, synthetic or natural, and they can contain, in addition to carbon, hydrogen, oxygen, nitrogen and halogen, other elements such as sulfur, phosphorus, boron, silicon and metals. The polymers preferred in the practice of this invention are those containing between about 0.75 and 62.5 percent by weight of carboxyl groups (—COOH).

One class of polymers contemplated are the well-known vinyl polymers such as are produced by the polymerization of one or more polymerizable, olefinic carboxylic acids, such as acrylic acid, methacrylic acid, α-haloacrylic acid, crotonic acid, cinnamic acid, atropic acid, maleic acid, itaconic acid, methylene malonic acid, mono-n-butyl maleate, and the like, with one or more other polymerizable, unsaturated compounds such as monovinyl aromatic hydrocarbons such as styrene, alpha-methyl styrene, para-chlorostyrene, mono-vinylnaphthalene, and the like; alkyl acrylate derivatives such as ethyl acrylate, 2-ethylhexyl acrylate, decyl acrylate, methyl methacrylate, butyl methacrylate, 2-ethylhexyl methacrylate, ethyl crotonate, and the like; halo-olefins and perhalo-olefins such as vinyl chloride, vinylidene chloride, trichloroethylene, chlorotrifluoroethylene, vinylidene fluoride, and the like; vinyl esters such as vinyl acetate, vinyl lactate, vinyl oleate, and the like; olefinically unsaturated nitriles such as acrylonitrile, methacrylonitrile, and the like; aliphatic olefins such as ethylene, propylene, butene, butadiene, isobutylene, piperylene, and the like; acrylic acid amides such as acrylamide, N,N-dimethylacrylamide, N,N-diethylacrylamide, and the like; and various other polymerizable, olefinic compounds such as dibutyl maleate, vinyl cyclohexyl ether, methyl vinyl ketone, allylidene diacetate, acrolein, vinyl pyrrolidone, and the like.

The preferred vinyl polymers contemplated for coating applications are polymers of monomers comprising (1) about 25–99 parts by weight, per 100 monomer parts, selected from the group consisting of monovinyl aromatic hydrocarbon, alkyl acrylate, alkyl methacrylate, α,β-olefinically unsaturated nitrile, vinyl halide, vinyl ester, cyanoalkyl acrylate, acrylamide and N,N-dialkylacrylamide, and (2) about 1–75 parts by weight, per 100 monomer parts, of α,β-olefinically unsaturated carboxylic acid.

Vinyl polymers which are particularly preferred in the practice of this invention for the production of hard, glossy, moisture and solvent resistant coatings are thermoplastic polymers of monomers comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of α,β- olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms.

Another class of polymers contemplated to be employed in the instant invention are polyesters and oil modified polyester derivatives. These resinous materials are produced by condensation reactions between polybasic acids and polyhydric alcohols, with or without modifying monoacids or alcohols. When an excess of polybasic acid is employed in the esterification condensation as compared to polyhydric alcohol, the final polyester resin products have residual carboxylic acid groups which are reactive with polyepoxide compounds containing at least two cyclohexene oxide groups. For example, linear polyester polymers, such as one from terephthalic acid and ethylene glycol, or one from 1,5-pentanediol and succinic acid, which have been produced to contain free carboxylic acid end groups, can be reacted with the polyepoxide compound to extend the chain length of the molecules and thereby raise the fusion point of the polymer. Such polymers can be converted from viscous liquids to solids. Extensive cross-linking can occur with the polyester resins if the reactive polyepoxide compound contains three or more cyclohexene oxide groups. Highly cross-linked polyesters can also be produced if the polymer chain contains free carboxylic acid along the chain, such as in polyesters formed by the condensation of a dihydric alcohol with an excess of a tricarboxylic acid derivative such as 1,2,4-butanetricarboxylic acid.

Another class of polymers contemplated are the "natural" resins containing free carboxylic acid groups such as pontianak, kauri, congo and dammar. For example, natural products containing abietic acid and other complex terpenic acid can be modified by the methods of this invention. Rosin, or rosin modified with maleic acid or fumaric acid, is chemically reactive with polyepoxide derivatives containing cyclohexene oxide groups. Cellulosics, such as carboxymethyl cellulose, can also be modified by reaction with these polyepoxide cross-linking agents.

In another of its aspects, this invention contemplates the cross-linking of polymers having reactive acid groups other than carboxyl groups. These materials are exemplified by vinyl polymers produced by the polymerization or copolymerization of monomers such as vinyl sulfonic acid, vinyl benzene sulfuric acid, vinyl phosphoric acid, 2-propene phosphoric acid, 1-methyl vinyl phosphoric acid, phenyl vinyl phosphoric acid, and the like.

The polymers and cross-linking agents that are to be interacted can be admixed in a solid form or they can be dissolved in a common solvent such as hydrocarbon, ketone, ester, and the like, or in mixtures of these solvents. The cross-linking agents can also be added to a latex dispersion of the polymer that is to be modified and mixing can be accomplished by agitation or some other suitable means. Plasticizers, pigments, dyes, reinforcing agents, fillers and like materials commonly used can be included in the compositions.

The following examples will serve to illustrate particular embodiments of this invention.

EXAMPLE 1

A resin containing free carboxylic acid groups was prepared in the following manner.

A two-liter glass reaction flask was equipped with a reflux condenser, a thermometer, a power-driven stirrer, a one-liter dropping funnel and a nitrogen inlet tube. The flask was immersed in a water bath and charged with the following polymerization ingredients.

Initial:
| | | |
|---|---|---|
| Water | grams | 394 |
| Duponol ME[1] | do | 4 |
| Potassium persulfate | do | 2 |
| Ethyl acrylate | do | 57 |
| Styrene | do | 21 |
| Acrylic acid | do | 1.6 |

Added:
| | | |
|---|---|---|
| Ethyl acrylate | do | 227 |
| Styrene | do | 87 |
| Acrylic acid | do | 6.4 |
| 10 percent ammonium hydroxide | milliliters | 32 |

[1] A sodium lauryl sulfate anionic surfactant.

The water, emulsifier and catalyst were added to the reaction flask and mixed thoroughly while purging under the liquid level with nitrogen. The monomers of the initial charge were then stirred into the reaction mixture. The flask was heated to 75° C. and the nitrogen inlet was adjusted to maintain a nitrogen blanket over the reaction mixture. The monomers of the additional charge were added at a rate of 3 to 5 milliliters per minute with sufficient agitation to prevent "pooling" on the surface. Throughout the monomer feed period the temperature was maintained at 75° C. to 80° C. After all of the monomer charge had been added over a period of approximately ninety minutes, the reaction was allowed to continue for an additional hour with the temperature being maintained. The reaction mixture was cooled and dilute ammonium hydroxide was added slowly with stirring to stabilize the latex that had been formed. The final product was smooth and creamy and the total solids was 50 to 50.5 weight percent. The resin recovered from a portion of the latex had a reduced viscosity of 1.95 in cyclohexanone.

The latex solution was diluted with water to 40 percent total solids. To 10 gram portions of this latex (4.0 grams of resin) were added 0.2 gram portions of one of several epoxide compounds.

The mixtures were contained in test tubes and were agitated for one hour and allowed to stand until the air bubbles disappeared. The epoxide compounds showed no sign of breaking the latex. Films were cast from the respective mixtures and after air drying for thirty minutes, the films were baked twenty minutes at 149° C. The insolubilities of the films were determined by treating them with refluxing toluene in a Soxhlet Extractor for two hours. The following results were observed:

| Epoxide | Percent Resin Insolubility |
|---|---|
| None | 0.3 |
| 3,4-Epoxy-6-methylcyclohexylmethyl 3,4-epoxy-6-methylcyclohexanecarboxylate | 92.1 |
| Bis(3,4-epoxy-6-methylcyclohexylmethyl) sebacate | 90.3 |
| Bis(3,4-epoxy-6-methylcyclohexylmethyl) adipate | 79.7 |
| Triethylene glycol bis-3,4-epoxy-6-methylcyclohexanecarboxylate | 87.8 |

EXAMPLE 2

A 2-ethylhexyl acrylate-acrylonitrile-acrylic acid terpolymer latex was prepared using the procedure of Example 1. The monomers were used in a weight ratio of 70/27.5/2.5. The final latex had a solids content of 49.1 percent.

To each of 10 gram portions of this latex mixture was added a small amount of one of several epoxide compounds. The concentrations of the epoxide compounds were chosen to give comparable molar concentrations based on the weight of resin content in the latex. Films were cast, baked twenty minutes at 149° C. and the insolubilities determined as described in Example 1. The following results were observed:

| Epoxide, and Parts per Hundred Parts of Resin | Percent Resin Insolubility |
|---|---|
| 3,4-Epoxy-6-methylcyclohexylmethyl 3,4-epoxy-6-methylcyclohexanecarboxylate (4.0 parts) | 94.5 |
| Diphenylolpropane diglycidyl ether (4.8 parts) | 83.2 |
| Bis(3,4-epoxy-6-methylcyclohexylmethyl) adipate (5.3 parts) | 94.1 |

EXAMPLE 3

The ethyl acrylate-styrene-acrylic acid terpolymer mixture of Example 1 was mixed in equal portions with each of several epoxide compounds. The concentrations of the various epoxide compounds were on the basis of equal molar concentrations rather than equal weight concentrations. The procedure of Example 1 was used to cross-link the respective mixtures and to determine the percent of insolubility.

| Epoxide, and parts per hundred parts of resin | Percent resin insolubility |
|---|---|
| Vinylcyclohexene dioxide (1.51 parts) | 4.3 |
| 3,4-epoxy-6-methylcyclohexylmethyl 3,4-epoxy-6-methylcyclohexanecarboxylate (3.2 parts) | 91.8 |
| Diphenylolpropane diglycidyl ether (3.8 parts) | 0.6 |
| Bis(3,4-epoxy-6-methylcyclohexylmethyl) adipate (4.3 parts) | 86.1 |

EXAMPLE 4

136 grams of vinyl chloride, 54 grams of di-n-butyl maleate, 10 grams of mono-n-butyl maleate, 2 grams of diacetyl peroxide and 100 grams of acetone were charged to a pressure bottle, and the bottle was rotated in a water bath at 50° C. for sixty-five hours. The resin was recovered by precipitating in isopropanol, washing with fresh isopropanol and drying. 126 grams of a dry resin were recovered which analyzed for 67.8 percent vinyl chloride and had a reduced viscosity of 0.41 in cyclohexanone, and a carboxyl content (—COOH) of 1.82 weight percent.

The resin was dissolved in a 1/1 solvent mixture of toluene and methyl isobutyl ketone to make a 35 percent solids solution. Two equal portions of this solution were prepared for curing with epoxide compounds. To one portion of the resin solution was added 7 parts by weight of 3,4-epoxy-6-methylcyclohexylmethyl 3,4-epoxy-6-methylcyclohexanecarboxylate per 100 parts of resin, and to the other portion of the resin solution was added the same concentration of diphenylolpropane diglycidyl ether. A film was cast from each of the resin solutions and baked for twenty minutes at 149° C. Insolubilities were determined by extraction in boiling methyl isobutyl ketone.

| Epoxide | Percent resin insolubility |
|---|---|
| 3,4-epoxy-6-methylcyclohexylmethyl 3,4-epoxy-6-methylcyclohexanecarboxylate | 68.1 |
| Diphenylolpropane diglycidyl ether | 0.4 |

EXAMPLE 5

A terpolymer of vinyl chloride/di-n-butyl maleate/mono-cyanoethyl maleate was prepared from the following charge in a pressure bottle:

| | Grams |
|---|---|
| Vinyl chloride | 69.0 |
| Di-n-butyl maleate | 26.0 |
| Mono-cyanoethyl maleate | 5.0 |
| Diacetyl peroxide | 1.0 |
| Acetone | 33.0 |

The polymerization reaction was conducted for forty-nine hours at 50° C. and the resin was precipitated in isopropanol, washed and dried. 65 grams of dry resin were recovered which contained 67.6 weight percent vinyl chloride and had a reduced viscosity of 0.38 in cyclohexanone and a carboxyl content (—COOH) of 1.78 weight percent.

A 35 percent solids solution of this resin was prepared as in Example 4. To one portion of this resin solution was added 7 parts by weight of 3,4-epoxy-6-methylcyclohexylmethyl 3,4-epoxy-6-methylcyclohexanecarboxylate, per 100 parts of resin, and to an equal portion of the resin solution from the previous example was added 7 parts by weight of the same epoxide compound per 100 parts of resin. A black iron panel was coated by each of the resin solutions containing the epoxide compounds. A second panel was coated from each resin solution not containing epoxide compounds. The coating techniques were very uniform, varying only from 24 to 27 milligrams per four square inches of coating.

After baking for twenty minutes at 149° C., the panels were half immersed in water at 77° C. and held there for thirty minutes. The coatings containing epoxide compounds showed much less whitening, or "blushing," than the coatings containing no epoxide compound.

EXAMPLE 6

A resin was prepared which was essentially the same as the vinyl chloride/di-n-butyl maleate/mono-n-butyl maleate terpolymer of Example 4. This resin contained 71.5 percent by weight of vinyl chloride and had a reduced viscosity of 0.35 in cyclohexanone and had a carboxyl content (—COOH) of 1.9 weight percent.

In this experiment curable compositions were prepared by mixing portions of the resin with a sufficient quantity of an epoxide compound to provide 0.5 equivalent of oxirane oxygen for each equivalent of carboxyl group.

A 35 percent solution of the resin was made in a 1/1 mixture of methyl isobutyl ketone and toluene. A calculated quantity of a diepoxide compound was added to a portion of this resin solution. Cast films were baked thirty minutes at 121° C. The insolubility of each coating was determined by extraction with hot methyl isobutyl ketone.

| Epoxide | Percent resin insolubility |
|---|---|
| Vinylcyclohexene dioxide | 0.0 |
| Diphenylolpropane diglycidyl ether | 0.0 |
| Bis(3,4-epoxy-6-methylcyclohexylmethyl) adipate | 70.9 |
| 3,4-epoxy-6-methylcyclohexylmethyl 3,4-epoxy-6-methylcyclohexanecarboxylate | 73.3 |

The films containing 3,4-epoxy-6-methylcyclohexylmethyl 3,4-epoxy-6-methylcyclohexanecarboxylate and bis(3,4-epoxy-6-methylcyclohexylmethyl) adipate were clear and flexible. The film containing vinylcyclohexene dioxide was clear, but brittle. The film containing diphenylolpropane diglycidyl ether was hazy and brittle. From the results, it was seen that at 121° C. only the films containing at least two cyclohexene oxide groups reacted to cross-link the resin.

EXAMPLE 7

Two vinyl chloride-vinyl acetate-maleic acid resins were prepared in the following manner:

| Charge: | Resin A Grams | Resin B Grams |
|---|---|---|
| Vinyl chloride | 20,400 | 20,400 |
| Vinyl acetate | 3,500 | 3,500 |
| Maleic acid | 2,172 | 1,000 |
| (Added as a 20 percent solution in acetone) diacetyl peroxide | 24 | 24 |

The vinyl acetate and diacetyl peroxide were charged to an autoclave with stirring. The maleic acid solution was added, then the autoclave was purged with nitrogen and the vinyl chloride was added. The autoclave temperature was maintained at about 50° C. and at a pressure of about 30 p.s.i. The polymerization was conducted for a period of fifteen hours in the case of resin A, and for twenty-six hours in the case of resin B.

Each resin was precipitated with isopropanol and dried for forty-eight hours at 55° C. 6,260 grams of resin A were recovered which contained 77.5 weight percent vinyl chloride, 10.4 weight percent vinyl acetate and 12.1 weight percent maleic acid, and had a reduced viscosity of 0.48 in cyclohexanone. 5,400 grams of resin B were recovered which contained 81.4 percent of vinyl chloride, 10.4 percent of vinyl acetate and 7.9 percent of maleic acid, and had a reduced viscosity of 0.51 in cyclohexanone.

Twenty percent solutions of the resins were prepared in a 1/1 mixture of toluene and methyl isobutyl ketone. 3,4-epoxy-6-methylcyclohexylmethyl 3,4-epoxy-6-methylcyclohexanecarboxylate was added to portions of the resin solutions in amounts calculated to give 0.5 and 1.0 equivalent of oxirane oxygen per equivalent of carboxyl group. For resin A, this amounted to 14.5 and 29.0 parts by weight of 3,4-epoxy-6-methylcyclohexylmethyl 3,4-epoxy-6-methylcyclohexanecarboxylate per 100 parts of resin. For resin B, this amounted to 9.5 and 19.0 parts by weight of 3,4-epoxy-6-methylcyclohexylmethyl 3,4-epoxy-6-methylcyclohexanecarboxylate per 100 parts of resin. Films were cast from these resin solutions, baked twenty minutes at 149° C. and treated with hot methyl isobutyl ketone solution.

| Resin | Equivalents of epoxide | Weight percent of epoxide | Percent resin insolubility |
|---|---|---|---|
| A | 0.5 | 14.5 | 78.1 |
| A | 1.0 | 29.0 | 83.8 |
| B | 0.5 | 9.5 | 72.0 |
| B | 1.0 | 19.0 | 83.8 |
| A | 0 | 0 | 0 |
| B | 0 | 0 | 1.2 |

Other films were prepared from the resin solutions by dip-coating. The coating weights were 25 to 31 milligrams per four square inches of coating. All the panels were baked twenty minutes at 149° C. All the panels passed a 64 inch/pound impact test. When rubbed with an acetone soaked rag, the films containing no 3,4-epoxy-6-methylcyclohexylmethyl 3,4-epoxy-6-methylcyclohexanecarboxylate immediately dissolved. The panel with the resin A and 3,4-epoxy-6-methylcyclohexylmethyl 3,4-epoxy-6-methylcyclohexanecarboxylate coating barely softened. The panel with resin B and 3,4-epoxy-6-methylcyclohexylmethyl 3,4-epoxy-6-methylcyclohexanecarboxylate softened to a greater degree than the resin A panel.

The panels which were used for the impact test were next put into a water bath for thirty minutes at 77° C. At the end of this period all the panels were "blushed" slightly. There was no great difference among the panels in this respect. The same panels were then placed in boiling water for thirty minutes. At the end of this time, the resin A coating without 3,4-epoxy-6-methylcyclohexylmethyl 3,4-epoxy-6-methylcyclohexanecarboxylate was "blushed" so badly that it was "chalky." The resin B coating without 3,4 - epoxy - 6 - methylcyclohexylmethyl 3,4 - epoxy - 6 - methylcyclohexanecarboxylate was badly "blushed," but not to the degree of the resin B coating. The resin A coating and the resin B coating containing 3,4-epoxy-6-methylcyclohexylmethyl 3,4-epoxy-6-methylcyclohexanecarboxylate were mainly unaffected by the second bath treatment at the higher temperature.

EXAMPLE 8

A resin was prepared in a pressure bottle from a charge consisting of 52.25 parts by weight of "oxo" decyl acrylate [1], 2.75 parts by weight of acrylic acid, 0.5 part by weight of diacetyl peroxide and 44.5 parts by weight of acetone. The bottle was purged with nitrogen, capped and tumbled end-over-end for forty-five hours at 50° C. The polymerization was terminated by cooling the reaction mixture and drying the polymer product in an oven at 55° C. The resulting resin was colorless and extremely sticky, and it had a reduced viscosity of 1.60 in benzene.

The resin was dissolved in toluene to make a 10 percent solids solution. To portions of this solution were added various diepoxides in amounts calculated to give 0.75 equivalent of oxirane oxygen for each equivalent of carboxyl group in the resin. Films were cast, baked thirty minutes at 121° C. and extracted with hot toluene to determine the respective insolubilities.

| Epoxide, and parts by weight per hundred parts of resin | Percent resin Insolubility |
|---|---|
| Vinylcyclohexene dioxide (3.8 parts) | 20.9 |
| Diphenylolpropane diglycidyl ether (9.5 parts) | 75.8 |
| 3,4-epoxy - 6 - methylcyclohexylmethyl 3,4-epoxy-6-methylcyclohexanecarboxylate (8.0 parts) | 93.0 |
| Bis(3,4-epoxy - 6 - methylcyclohexylmethyl) adipate (10.6 parts) | 91.3 |

EXAMPLE 9

A procedure similar to that in Example 4 was performed. Equal portions of vinyl chloride/di-n-butyl maleate/mono-n-butyl maleate copolymer were mixed with an amount of a polyepoxide compound which provided 1.17 equivalents of epoxy groups for each carboxylic acid group contained in the polymer. Films were cast from the mixtures and these were tested for solubility in boiling methyl isobutyl ketone. The polyepoxides employed and the results obtained were as follows:

D—3,4 - epoxy-6-methylcyclohexylmethyl 3,4 - epoxy - 6- methylcyclohexanecarboxylate
E—1,1,1-trimethylolpropane tris(3,4-epoxy-cyclohexanecarboxylate)
F—Bis(3,4-epoxy-6-methylcyclohexylmethyl) 3,4-epoxy-6-methylcyclohexanecarboxaldehyde acetal

| Epoxide | Epoxide purity, percent | Grams | Equivalents | Percent resin insolubility |
|---|---|---|---|---|
| D | 90 | 0.20 | 1.17 | 93.4 |
| E | 80 | 0.27 | 1.17 | 89.7 |
| F | 87.4 | 0.20 | 1.17 | 94.2 |

EXAMPLE 10

A procedure similar to that in Example 4 was performed. Equal portions of vinyl chloride/di-n-butyl maleate/mono-n-butyl maleate copolymer were mixed with an amount of a polyepoxide compound which provided 1.15 equivalents of epoxy group for each carboxylic acid group contained in the polymer. Films were cast from the mixture and these were treated for solubility

[1] Acrylic ester of a decyl alcohol obtained by hydroformylation ("oxo" process) of tripropylene.

in boiling toluene. The polyepoxides employed and the results obtained were as follows:

| Epoxide[1] | Epoxide purity, percent | Grams | Equivalents | Percent resin insolubility |
|---|---|---|---|---|
| D | 90 | 0.25 | 1.15 | 68.1 |
| E | 80 | 0.34 | 1.15 | 65.3 |
| F | 87.4 | 0.25 | 1.15 | 57.5 |

[1] Defined in Example 9.

EXAMPLE 11

This example illustrates the use of a cross-linking agent of this invention for the preparation of a hard, glossy, moisture and solvent resistant latex paint finish.

Latex Preparation

The polymerization was accomplished by charging the assembled apparatus with:

| | Grams |
|---|---|
| Water (deionized) | 530 |
| Potassium persulfate $K_2S_2O_8$ | 2 |
| Duponol Me [1] | 2.5 |
| Tergitol NPX [2] | 7.5 |

[1] Defined in Example 1.
[2] Ethylene oxide adduct of nonyl phenol; specific gravity 20/20° C., 1.066; solidification temperature, 0° C.

Air was flushed out of the closed reaction flask with nitrogen at atmospheric pressure. The water bath surrounding the reaction flask was heated to a temperature of 75° C., and controlled addition of the following monomertelogen solution was commenced:

| | Grams |
|---|---|
| Styrene | 180 |
| Ethyl acrylate | 160 |
| Acrylonitrile | 40 |
| Acrylic acid | 20 |
| t-Octyl mercaptan | 2 |

The feed was added at 45 percent to 50 percent per hour. On completion of monomer addition (2 hours), the latex was held at 75° C. to 77° C. for thirty minutes to allow complete reaction of residual monomers. The latex product was then cooled to 25° C. and neutralized with 50 grams of ammonium hydroxide (10 percent solution). The addition of ammonium hydroxide to the latex produced excellent chemical and mechanical stability. The latex had a solids content ($T_s$) of 40.7% and a pH of 8. The latex resin had a reduced viscosity ($I_r$) of 0.29 and a second order transition temperature ($T_G$) of 56° C.

Latex Metal Paint Preparation

A predispersion or pigment paste was made of white titanium dioxide ($TiO_2$, R–510) pigment in water as follows:

| | Grams |
|---|---|
| Water | 200 |
| Calgon [1] | 4 |
| $TiO_2$(R–510) | 800 |

[1] Sodium pyrophosphate.

These materials were stirred together to form a highly thixotropic (high viscosity at low shear rate) slurry of dispersing pigment in water. The slurry was ground in a pebble mill for twenty-four hours to achieve complete dispersion. Portions of this pigment predispersion were then used to convert some of the following latex examples into white metal finishes. Dry pigments can be added directly to latex compositions and dispersed, but the preparation of a predispersion has been found to be convenient.

A white metal paint was prepared from the above latex with the following formulation:

| | Grams |
|---|---|
| Latex | 300 |
| Water | 100 |
| Pigment predispersion (TiO$_2$, R–510) (80% T$_s$) | 37.5 |
| Tributyl phosphate | 12 |
| Foamex [1] | 12 |
| Butyl "Carbitol" acetate [2] | 12 |
| 3,4-epoxy - 6 - methylcyclohexylmethyl 3,4-epoxy-6-methylcyclohexanecarboxylate (87% pure) | 12 |

[1] Modified alkyl esters; specific gravity 25°/25° C., 0.96–0.97; Glyco Products Company.
[2] Butyl diethylene glycol acetate.

These ingredients were mixed in order with constant stirring. The resulting paint was sprayed on unprimed bonderized steel panels, allowed to air-dry fifteen minutes, baked fifteen minutes at a temperature of 82° C. and then thirty minutes at 149° C. A smooth, continuous, hard, highly glossy metal finish resulted. The adhesion of these metal finishes was found to be excellent. As measured on the Hesiometer (a device for measuring the force required to remove a coating from a metal substrate) these latex finishes were found to have four to six times the adhesive capacity of conventional commercial solution coating finishes.

The latex paint finish on steel panels was exposed to Florida weather for six months to test weathering durability (gloss retention, chalking, checking, blistering, etc.) under hot tropical conditions. The finish had an excellent rating in this test, comparable to standard automotive lacquers and enamels. Gloss retention was superior to standard enamels and equivalent to lacquers. In another test, the latex paint finish was exposed to 100 percent relative humidity for 1,000 hours at 50° C. and inspected for blistering, adhesion failure, softening, swelling, peeling, etc. The paint finish rated excellent in this test and was superior to several standard automotive lacquers and enamels.

Latex paint finishes prepared in the same manner as described above except for the incorporation of a polyfunctional cyclohexene oxide-containing cross-linking agent, did not have the same excellent weathering durability and were inferior in their resistance to humidity and solvents.

EXAMPLE 12

This example illustrates the ability of a cross-linking agent of this invention to cross-link carboxyl-containing resins at room temperature.

The latex was prepared according to the procedure described in Example 11. The latex had a 32.5 percent solids content of styrene/ethyl acrylate/acrylonitrile/acrylic acid resin with a parts by weight ratio of 45/40/10/5. The resin was soluble in hot methyl isobutyl ketone.

Two hundred grams of the latex were mixed with the following:

| | Grams |
|---|---|
| Ethylene glycol | 6.5 |
| Ketosol "75" [1] | 19.5 |
| 2-ethylhexanol | 6.5 |
| 3,4-epoxy-6-methylcyclohexylmethyl 3,4 - epoxy-6-methylcyclohexanecarboxylate | 7.5 |

[1] 75% methyl phenyl carbinol/25% acetophenone.

The amount of 3,4-epoxy-6-methylcyclohexylmethyl 3,4-epoxy-6-methylcyclohexanecarboxylate (88% purity) was calculated to provide one cyclohexene oxide oxirane oxygen group for each carboxyl group contained in the latex resin.

After one hour of stirring, the homogeneous mixture was cast as films on four separate weighed strips of aluminum foil. These films were then allowed to age at room temperature (25° C.±2° C.). Insolubility of the films in boiling methyl isobutyl ketone was determined after different aging periods. The results were as follows:

| Time: | Percent insoluble |
|---|---|
| 1 week | 36.5 |
| 2 weeks | 47.2 |
| 4 weeks | 58.6 |
| 35 weeks | 72.0 |

EXAMPLE 13

A styrene (45 parts by weight)/ethyl acrylate (40 parts by weight)/acrylonitrile (10 parts by weight)/acrylic acid (5 parts by weight) latex was prepared using the same technique described in Example 11. The latex was adjusted to a pH of 6.3 with aqueous ammonium hydroxide to give a total solids content of 41.2 percent. The resin dispersed in the latex had a reduced viscosity of 0.26.

Ten gram portions of the latex, with and without polyepoxide cross-linking agents, were cast as films on weighed aluminum foil strips. The films were baked and then they were submitted to hot methyl isobutyl ketone extraction to determine the insolubility of the respective films. The results are tabulated below.

| Epoxide | Equivlanets of epoxide | Percent insoluble | |
|---|---|---|---|
| | | 40 hr./121° C. | 20 hr./149° C. |
| EP-A (0.46 g.) [1] | 1.0 | 51.4 | 59.6 |
| EP-B (0.49 g.) [2] | 1.0 | 26.4 | 35.8 |
| EP-C (0.64 g.) [3] | 1.0 | 4.1 | 51.2 |
| None | | 0.0 | 0.0 |

[1] 3,4-epoxy-6-methylcyclohexylmethyl 3,4-epoxy-6-methylcyclohexanecarboxylate.
[2] Diphenylolpropane diglycidyl ether.
[3] 3,4-epoxy-6-methylcyclohexylmethyl 9, 10, 12, 13-diepoxystearate.

EXAMPLE 14

A methyl methacrylate (45 parts by weight)/ethyl acrylate (40 parts by weight)/acrylonitrile (10 parts by weight)/acrylic acid (5 parts by weight) latex was prepared using the same technique described in Example 11. Aqueous ammonium hydroxide was added to adjust the pH of the latex which had a final solids content of 31.0 percent.

Ten gram portions of the latex, with and without added polyepoxide cross-linking agents, were cast as films on weighed aluminum foil strips. The films were baked, and then insolubility of the respective films was determined by extraction with hot methyl isobutyl ketone. The results are tabulated below.

| Epoxide | Equivlanets of epoxide | Percent insoluble | |
|---|---|---|---|
| | | 40 hr./121° C. | 20 hr./149° C. |
| EP-D (0.35 g.) [1] | 1.0 | 60.1 | 74.0 |
| EP-E (0.37 g.) [2] | 1.0 | 44.5 | 68.3 |
| EP-F (0.48 g.) [3] | 1.0 | 25.0 | 52.8 |
| None | | 0.3 | 0.0 |

[1] 3,4-epoxy-6-methylcyclohexylmethyl 3,4-epoxy-6-methylcyclohexanecarboxylate.
[2] Diphenylolpropane diglycidyl ether.
[3] 3,4-epoxy-6-methylcyclohexylmethyl 9, 10, 12, 13-diopoxystearate.

What is claimed is:

1. An improved method for crosslinking a thermoplastic resinous polymer containing recurring pendent free carboxylic acid radicals which comprises reacting said polymer at a temperature between about 25° C. and 150° C. with a sufficient quantity of a compound having at least two cyclohexene oxide groups to provide between 0.1 and 4.0 cyclohexene oxide oxirane oxygen groups for each free carboxylic acid group in the polymer.

2. An improved process for cross-linking polymers which comprises reacting a thermoplastic resinous polymer containing recurring pendent free carboxylic acid radicals at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer.

3. An improved process for cross-linking polymers to make them less thermoplastic and more solvent insoluble which comprises heating a thermoplastic polymer of monomers comprising between about 25 and 99 parts by weight, per 100 monomer parts, of monovinyl aromatic hydrocarbon and between about 1 and 75 parts by weight, per 100 monomer parts, of $\alpha,\beta$-olefinically unsaturated carboxylic acid at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer.

4. An improved process for cross-linking polymers to make them less thermoplastic and more solvent insoluble which comprises heating a thermoplastic polymer of monomers comprising between about 25 and 99 parts by weight, per 100 monomer parts, of alkyl acrylate and between about 1 part and 75 parts by weight, per 100 monomer parts, of $\alpha,\beta$-olefinically unsaturated carboxylic acid at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer.

5. An improved process for cross-linking polymers to make them less thermoplastic and more solvent insoluble which comprises heating a thermoplastic polymer of monomers comprising between about 25 and 99 parts by weight, per 100 monomer parts, of alkyl methacrylate and between about 1 part and 75 parts by weight, per 100 monomer parts of $\alpha,\beta$-olefinically unsaturated carboxylic acid at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer.

6. An improved process for cross-linking polymers to make them less thermoplastic and more solvent insoluble which comprises heating a thermoplastic polymer of monomers comprising between about 25 parts and 99 parts by weight, per 100 monomers parts, of vinyl halide and between about 1 part and 75 parts by weight, per 100 monomer parts, of $\alpha,\beta$-olefinically unsaturated carboxylic acid at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer.

7. An improved process for cross-linking polymers to make them less thermoplastic and more solvent insoluble which comprises heating a thermoplastic polymer of monomers comprising between about 25 parts and 99 parts by weight, per 100 monomer parts, of vinyl ester and between about 1 part and 75 parts by weight, per 100 monomer parts, of $\alpha,\beta$-olefinically unsaturated carboxylic acid at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer.

8. An improved process for cross-linking polymers which comprises heating a thermoplastic vinyl polymer of monomers comprising about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, 0–50 parts by weight of $\alpha,\beta$-olefinically unsaturated nitrile, about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and about 1–10 parts by weight of $\alpha,\beta$-olefinically unsaturated carboxylic acid containing up to about ten carbon atoms.

9. An improved method for cross-linking polymers which comprises heating a polymer of monomers comprising about 25–90 parts by weight of styrene, 0–50 parts by weight of acrylonitrile, about 10–60 parts by weight of ethyl acrylate and about 1–10 parts by weight of acrylic acid at a temperature between about 50° C. and 150° C. with a sufficient quantity of 3,4-epoxy-6-methylcyclohexylmethyl 3,4-epoxy-6-methylcyclohexanecarboxylate to provide between 0.5 and 1.5 cyclohexene oxide oxirane oxygen groups for each free carboxylic acid group in the polymer.

10. An improved method for cross-linking polymers which comprises heating a polymer of monomers comprising about 25–99 parts by weight, per 100 monomer parts, of vinyl chloride and vinyl acetate and about 1–75 parts by weight, per 100 monomer parts, of maleic acid at a temperature between about 50° C. and 150° C. with a sufficient quantity of 3,4-epoxy-6-methylcyclohexylmethyl 3,4-epoxy-6-methylcyclohexanecarboxylate to provide between 0.5 and 1.5 cyclohexene oxide oxirane oxygen groups for each free carboxylic acid group in the polymer.

11. A curable composition comprising an epoxy free resinous polymer containing recurring pendant free carboxylic acid radicals in admixture with a sufficient quantity of a compound having at least two cyclohexene oxide oxirane oxygen groups to provide between 0.1 and 4.0 cyclohexene oxide oxirane oxygen groups for each free carboxylic acid group in the polymer.

12. An improved process for crosslinking polymers to make them less thermoplastic and more solvent insoluble which comprises heating a thermoplastic polymer of monomers comprising between about 25 parts and 99 parts by weight, per 100 monomer parts, of styrene and between about 1 part and 75 parts by weight, per 100 monomer parts, of acrylic acid at a temperature between about 50° C. and 150° C. with a sufficient quantity of 3,4-epoxy-6-methylcyclohexylmethyl 3,4-epoxy-6-methyl cyclohexanecarboxylate to provide between 0.5 and 1.5 cyclohexene oxide oxirane oxygen groups for each free carboxylic acid group in the polymer.

13. The composition of claim 11 cured at a temperature between 25° C. and 150° C.

References Cited in the file of this patent

UNITED STATES PATENTS

| | | |
|---|---|---|
| 2,500,016 | Allenby | Mar. 7, 1950 |
| 2,604,457 | Segall et al. | July 22, 1952 |
| 2,604,464 | Segall et al. | July 22, 1952 |
| 2,687,404 | Robertson | Aug. 24, 1954 |
| 2,750,395 | Phillips et al. | June 12, 1956 |
| 2,761,870 | Payne et al. | Sept. 4, 1956 |
| 2,772,296 | Mueller | Nov. 27, 1956 |
| 2,781,333 | Urdegraff | Feb. 12, 1957 |
| 2,826,562 | Shokal | Mar. 11, 1958 |
| 2,870,170 | Payne | Jan. 20, 1959 |
| 2,890,194 | Phillips et al. | June 9, 1959 |
| 2,949,441 | Newey | May 3, 1960 |

FOREIGN PATENTS

| | | |
|---|---|---|
| 881,981 | France | May 13, 1953 |

UNITED STATES PATENT OFFICE
CERTIFICATE OF CORRECTION

Patent No. 3,027,357            March 27, 1962

Ralph Stickle, Jr.

It is hereby certified that error appears in the above numbered patent requiring correction and that the said Letters Patent should read as corrected below.

Column 2, line 24, for "compositons" read -- compositions --; column 4, lines 30 to 36, after the closing parenthesis, insert a subscript "2"; column 7, line 5, for "bis(21ethylhexyl-" read -- bis(2-ethylhexyl- --; column 16, line 65, for "pendent" read -- pendant --; column 18, line 9, after "atoms" insert -- at a temperature between about 50° C. and 150° C. with a sufficient quantity of a compound having at least two cyclohexene oxide groups to provide between 0.5 and 1.5 cyclohexene oxide oxirane oxygen groups for each free carboxylic acid group in the polymer --.

Signed and sealed this 28th day of August 1962.

(SEAL)
Attest:

ESTON G. JOHNSON            DAVID L. LADD
Attesting Officer            Commissioner of Patents